United States Patent
Yokoyama et al.

(10) Patent No.: US 12,454,153 B2
(45) Date of Patent: Oct. 28, 2025

(54) TIRE

(71) Applicant: BRIDGESTONE CORPORATION, Tokyo (JP)

(72) Inventors: Akinori Yokoyama, Tokyo (JP); Saya Kamitabira, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/579,937

(22) PCT Filed: Jun. 23, 2022

(86) PCT No.: PCT/JP2022/025149
§ 371 (c)(1),
(2) Date: Jan. 17, 2024

(87) PCT Pub. No.: WO2023/013280
PCT Pub. Date: Feb. 9, 2023

(65) Prior Publication Data
US 2024/0336091 A1   Oct. 10, 2024

(30) Foreign Application Priority Data
Aug. 4, 2021 (JP) .................. 2021-128531

(51) Int. Cl.
*B60C 11/13* (2006.01)
*B60C 11/04* (2006.01)
*B60C 11/03* (2006.01)

(52) U.S. Cl.
CPC .............. *B60C 11/13* (2013.01); *B60C 11/04* (2013.01); *B60C 11/1307* (2013.01); *B60C 2011/0353* (2013.01); *B60C 2011/0365* (2013.01)

(58) Field of Classification Search
CPC ................. B60C 11/04; B60C 11/1307; B60C 2011/0365; B60C 2011/0353
See application file for complete search history.

(56) References Cited

U.S. PATENT DOCUMENTS 3,462,328 A   8/1969  Buckland
3,763,911 A * 10/1973  Montagne ........... B60C 11/0309
                                                 152/209.19
(Continued)

FOREIGN PATENT DOCUMENTS

JP       59-179408 A  * 10/1984
JP       08-002214 A  *  1/1996
(Continued)

OTHER PUBLICATIONS

Machine translation for Japan 2001-121924 (Year: 2025).*
(Continued)

*Primary Examiner* — Steven D Maki
(74) *Attorney, Agent, or Firm* — KENJA IP LAW PC (57) ABSTRACT

The tire of this disclosure is a tire comprising a plurality of circumferential main grooves 2 on a tread surface 1, wherein when a pair of circumferential main grooves, located closest to tread edges on each side in the tire width direction among the plurality of circumferential main grooves 2, are referred to as shoulder main grooves 21a and 21b, at least one of the shoulder main grooves is a normal main groove configured such that a maximum groove width position in the groove depth direction is located only at a tread surface position, and at least one circumferential main groove other than the at least one shoulder main groove is a widened main groove configured such that at least one maximum groove width position in the groove depth direction is located on a groove bottom side than the tread surface position.

4 Claims, 9 Drawing Sheets

(56) References Cited

U.S. PATENT DOCUMENTS

| | | | | |
|---|---|---|---|---|
| 2013/0213542 A1* | 8/2013 | Warfford | ............... | B60C 11/12 152/209.1 |
| 2019/0232728 A1 | 8/2019 | Nakajima | | |

FOREIGN PATENT DOCUMENTS

| | | | |
|---|---|---|---|
| JP | H11123909 A | | 5/1999 |
| JP | 2001-121924 A | * | 5/2001 |
| JP | 2013049325 A | | 3/2013 |
| JP | 2013129427 A | | 7/2013 |
| JP | 2016088427 A | | 5/2016 |
| JP | 2017505261 A | | 2/2017 |
| JP | 2017222190 A | | 12/2017 |
| JP | 2018039482 A | | 3/2018 |
| JP | 2019116195 A | | 7/2019 |
| JP | 2019127228 A | | 8/2019 |
| JP | 2020006924 A | | 1/2020 |

OTHER PUBLICATIONS

Machine translation for Japan 08-002214 (Year: 2025).*
Machine translation for Japan 59-179408 (Year: 2025).*
Feb. 6, 2024, International Preliminary Report on Patentability issued in the International Patent Application No. PCT/JP2022/025149.
Sep. 19, 2024, search result of the Extended European Search Report issued by the European Patent Office in the corresponding European Patent Application No. 22852706.5.
Sep. 20, 2022, International Search Report issued in the International Patent Application No. PCT/JP2022/025149.

* cited by examiner

TIRE

TECHNICAL FIELD

This disclosure relates to a tire.

BACKGROUND

Regarding the noise generated from running cars, as vehicles become quieter and quieter, the proportion of noise caused by the load rolling of tires has increased, and there is a need to reduce it. Among them, noise due to air column resonance sound is the primary source of exterior noise generated by tires. The air column resonance sound is the noise generated by the resonance of the air inside the tube, which is enclosed by the circumferential grooves extending continuously in the circumferential direction on the tread surface and the road surface.

For example, a tire intended to reduce air column resonance sound has Helmholtz-type resonators which are provided in a land portion divided by a plurality of circumferential main grooves. The Helmholtz-type resonator comprises a cavity substantially sealed within the land portion and terminating at both ends in the length direction within the land portion, a connecting hole connecting the cavity and the circumferential main groove, and a sipe (Patent Document 1).

CITATION LIST

Patent Literature

PTL 1: JP 2019/116195 A1

SUMMARY

Technical Problem

However, there is a need to reduce air column resonance sound through simpler configurations, etc.

Therefore, the object of the present disclosure is to provide a tire that can reduce air column resonance sound as a vehicle is running.

Solution to Problem

The gist of this disclosure is as follows.

A tire comprising a plurality of circumferential main grooves, on a tread surface, extending in the tire circumferential direction and having a groove width that prevents two side walls from contacting each other when the tire is grounded, wherein
 when a pair of circumferential main grooves, located closest to tread edges on each side in the tire width direction among the plurality of circumferential main grooves, are referred to as shoulder main grooves,
 at least one of the shoulder main grooves is a normal main groove configured such that a maximum groove width position in the groove depth direction is located only at a tread surface position, and
 at least one circumferential main groove other than the at least one shoulder main groove is a widened main groove configured such that at least one maximum groove width position in the groove depth direction is located on a groove bottom side than the tread surface position.

Advantageous Effect

According to the present disclosure, it is possible to provide a tire that can reduce air column resonance sound as a vehicle is running.

BRIEF DESCRIPTION OF THE DRAWINGS

In the accompanying drawings.

DETAILED DESCRIPTION

The tires according to the present disclosure can be used for any type of tire, but are suitably used for passenger vehicle tires.

Hereinafter, embodiments of the tires according to the present disclosure will be described by way of example with reference to the drawings. Common components in each figure are given the same reference numerals.

Figure 2:
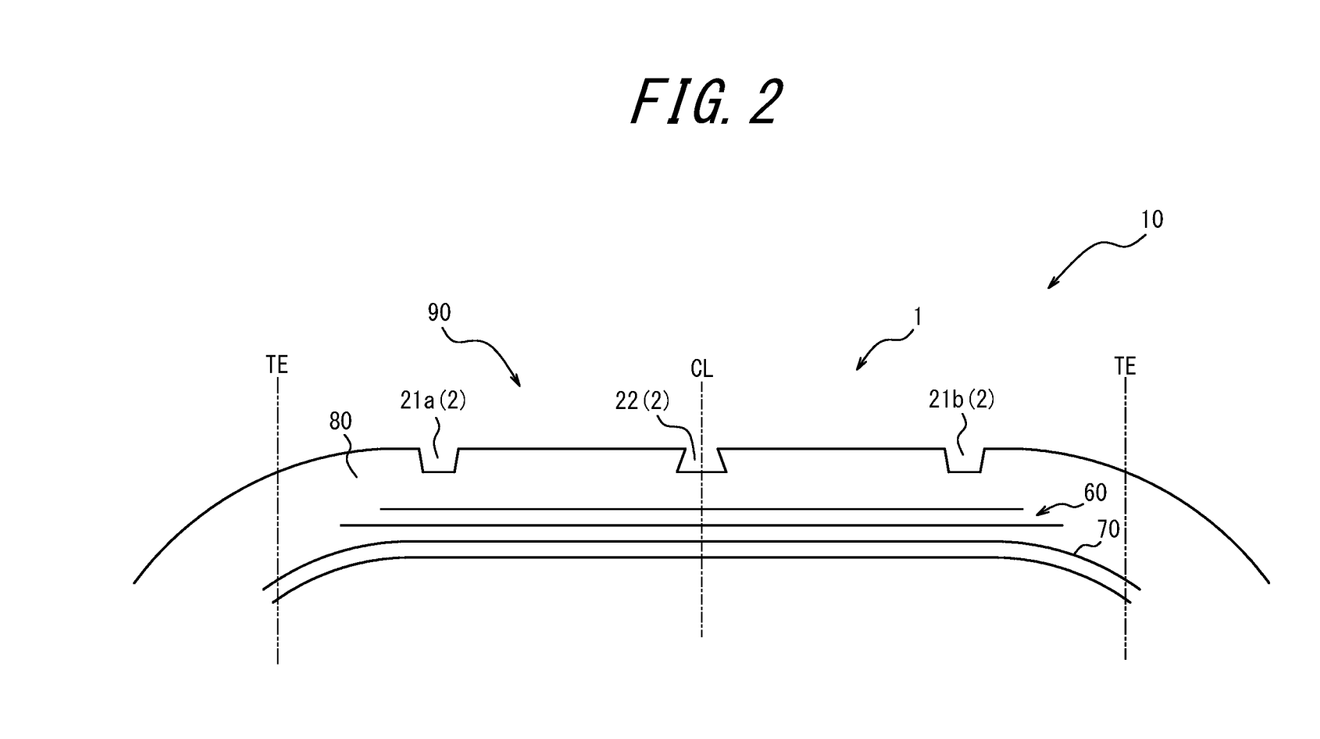
FIG. 2 is a cross-sectional view in the tire width direction, illustrating a portion of the tire in FIG. 1 in a cross-section along line A-A in FIG. 1.

The tire in each of the embodiments described herein may have any internal configuration. The tire in each of the embodiments described herein, for example, can comprises a pair of bead cores (not illustrated) provided in a pair of bead portions, a pair of bead fillers (not illustrated) located on the outer side in the tire radial direction of the bead core, a carcass 70 (FIG. 2), a belt 60 (FIG. 2), a tread rubber 80 (FIG. 2). The carcass 70 extends toroidally between the pair of bead cores. The carcass 70 includes at least one layer of carcass ply (one layer in the illustrated example). The carcass ply of the carcass 70 can be composed of, for example, steel or organic fiber cords coated with rubber. The carcass 70 can include, for example, a body portion extending toroidally between the pair of bead cores, and a pair of turn-up portions folded from the innermost end in the tire radial direction of the body portion around the bead cores toward the outer side in the tire width direction, on each side of the tire equatorial plane CL. The belt 60 is disposed in the tread portion 90, on the outer side in the tire radial direction than the crown area of the carcass 70 (FIG. 2). The belt 60 consists of at least one belt layer (two layers in the illustrated example). The belt layer can be composed of, for example, steel or organic fiber cords coated with rubber. Tread rubber 80 is disposed on the outer side in the tire radial direction of the belt 60.

As used herein, the term "tread surface (1)" means the outer circumferential surface of the tire that is in contact with the road surface when the tire is mounted on a rim, filled with prescribed internal pressure, and rolled under a maximum load.

As used herein, the term "tread edge" means the outer edge of the tread surface in the tire width direction.

In addition, as used herein, the term "ground contact length" means the length along the tire circumferential direction of a ground contact patch where the tire contacts the road surface, and the term "ground contact patch" means the outer surface of the tire that contacts the road surface when the tire is mounted on a rim, filled with prescribed internal pressure, and grounded with a maximum load applied.

Here, the term "rim" refers to the standard rim in the applicable size (Measuring Rim in ETRTO's STANDARDS MANUAL and Design Rim in TRA's YEAR BOOK) as described or as may be described in the future in the industrial standard, which is valid for the region in which the tire is produced and used, such as JATMA YEAR BOOK of JATMA (Japan Automobile Tyre Manufacturers Association) in Japan, STANDARDS MANUAL of ETRTO (The European Tyre and Rim Technical Organization) in Europe, and YEAR BOOK of TRA (The Tire and Rim Association, Inc.) in the United States (That is, the "rim" includes current sizes as well as future sizes to be listed in the aforementioned industrial standards. An example of the "size as described in the future" could be the sizes listed as "FUTURE DEVELOPMENTS" in the ETRTO's STANDARDS MANUAL 2013 edition.). For sizes not listed in the above industrial standards, the term "rim" refers to a rim with a width corresponding to the bead width of the tire.

In addition, the "prescribed internal pressure" refers to the air pressure (maximum air pressure) corresponding to the maximum load capacity of a single wheel in the applicable size and ply rating, as described in the aforementioned JATMA YEAR BOOK and other industrial standards. In the case that the size is not listed in the aforementioned industrial standards, the "prescribed internal pressure" refers to the air pressure (maximum air pressure) corresponding to the maximum load capacity specified for each vehicle in which the tire is mounted.

The term "maximum load" shall mean the load corresponding to the above maximum load capacity.

Note, that the term "air" used herein can be replaced by inert gas such as nitrogen gas or other inert gas.

In this document, unless otherwise noted, the dimensions of each element such as grooves and land portions, ground contact width (TW), etc., shall be measured in the "reference condition" described below.

In this document, the "reference condition" refers to the condition in which the tire is mounted on the rim, filled with the above prescribed internal pressure, and unloaded.

Also, in this document, the "groove width of circumferential main groove" shall mean the length in the direction perpendicular to the extending direction of the circumferential main groove, as measured in the above reference condition. Similarly, the "groove width of width direction groove" shall mean the length in the direction perpendicular to the extending direction of the width direction groove, as measured under reference conditions.

First Embodiment

The tire according to the first embodiment of this disclosure is described below with reference to FIGS. 1, 2, 3A, and 3B.

Figure 1:
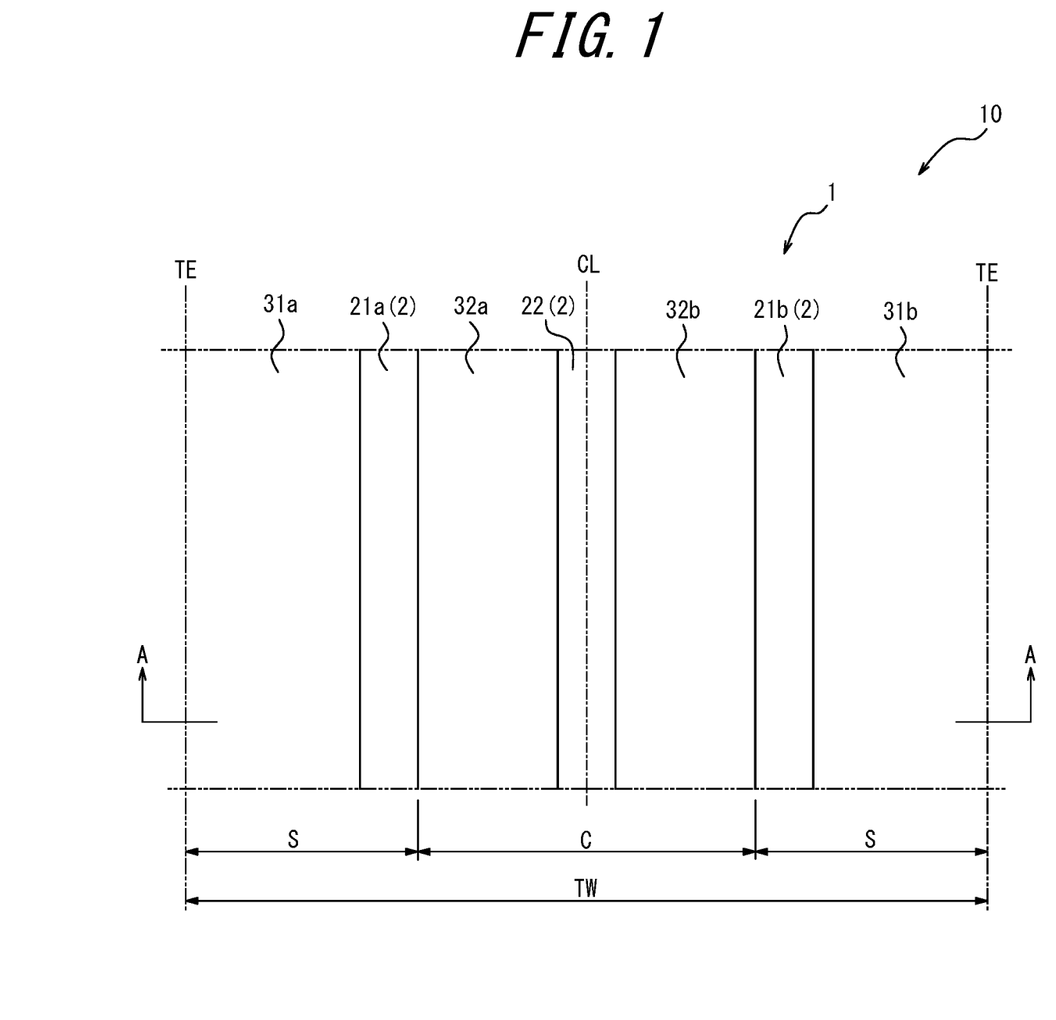
FIG. 1 is a partially developed view of a tire according to the first embodiment of this disclosure, schematically illustrating the tread surface.
Figure 3A:
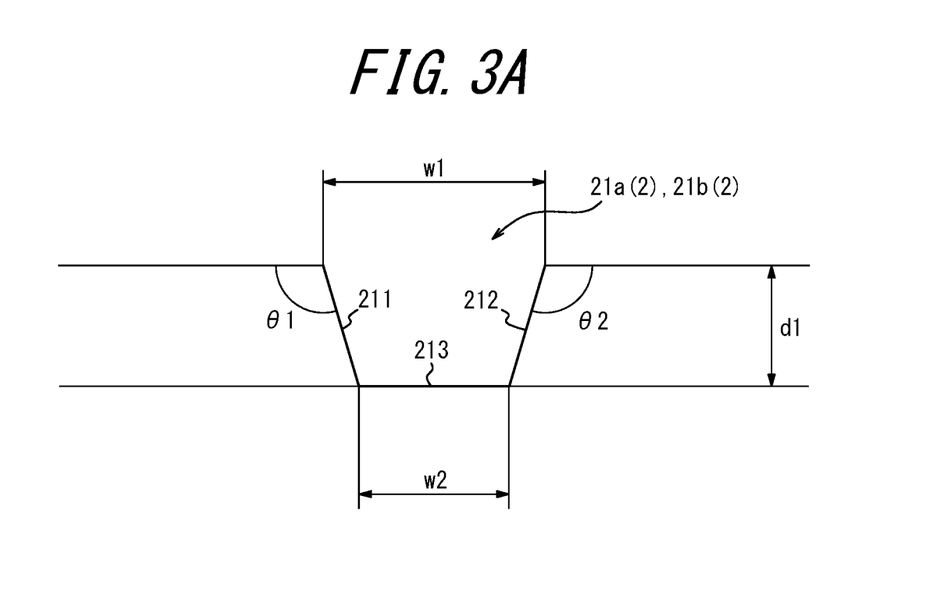
FIG. 3A is a partial cross-sectional view in the tire width direction, schematically illustrating an enlarged portion of the tire in FIG. 2.
Figure 3B:
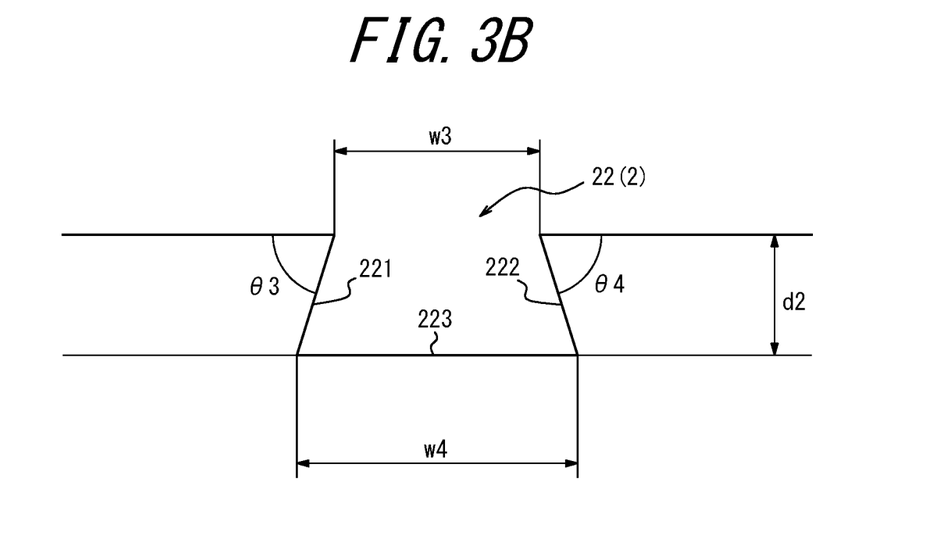
FIG. 3B is a partial cross-sectional view in the tire width direction, schematically illustrating an enlarged portion of the tire in FIG. 2.

FIG. 1 is a partially developed view of a tire 10 according to the first embodiment of this disclosure, schematically illustrating the tread surface 1. FIG. 2 is a cross-sectional view in the tire width direction, illustrating a portion of the tire 10 in FIG. 1 in a cross-section along line A-A in FIG. 1. FIG. 3A is a partial cross-sectional view in the tire width direction, schematically illustrating an enlarged portion of the tire in FIG. 2, and FIG. 3B is a partial cross-sectional view in the tire width direction, schematically illustrating an enlarged portion of the tire in FIG. 2.

As illustrated in FIG. 1, the tire 10 of the first embodiment comprises a plurality of circumferential main grooves 2 on the tread surface 1. Each circumferential main groove 2 extends in the tire circumferential direction. Each circumferential main groove 2 may extend in a straight line along the circumferential direction, as illustrated in FIG. 1, or it may extend circumferentially in a zigzag or wavy shape, etc. Among the plurality of circumferential main grooves 2, a pair of circumferential main grooves, located closest to the tread edges TE on each side in the tire circumferential direction are referred to as a pair of shoulder main grooves 21a and 21b. In addition, the circumferential main groove(s) located on the inner side in the tire width direction than the pair of shoulder main grooves is/are referred to as center main groove(s) 22.

The number of circumferential main grooves 2 is suitably three or more (three in this embodiment) from the viewpoint of drainage performance, but two may also be used.

Each circumferential main groove 2 has a groove width that prevents the two side walls from contacting each other when the tire is grounded. That is, the circumferential main grooves are configured so that when the tire is mounted on the rim, filled with the prescribed internal pressure, and loaded with the maximum load, the pair of opposite groove walls do not contact each other at the position directly under the load.

In addition, the tread surface 1 of the tire 10 of the first embodiment has four land portions 31a, 31b, 32a, and 32b defined by the shoulder main grooves 21a and 21b, the center main groove 22, and the tread edges TE. The tread edges TE and the shoulder main grooves 21a and 21b define shoulder land portions 31a and 31b on the outer side in the tire width direction, and the center main groove 22 and the shoulder main grooves 21a and 22b define a center land portions 32a and 32b on the inner side in the tire width direction than the land portions 31a and 31a.

As illustrated in FIGS. 2 and 3A, at least one shoulder main groove, both of the pair of shoulder main grooves 21a and 21b in the first embodiment, are normal main grooves, configured such that the maximum groove width position in the groove depth direction is located only at the tread surface position. That is, for the shoulder main grooves 21a and 21b, in the reference condition, the groove width w1 at the position of the tread surface 1 is a maximum groove width, and on the inner side in the tire radial direction than the tread surface 1, i.e., the groove bottom side, the groove width is smaller than the groove width w1 at any position. In the tire 10 of this embodiment, the groove width gradually decreases from the tread surface 1 side having the groove width w1 toward the inner side in the tire radial direction, and the groove width w2 at the groove bottom is a minimum groove width. Note, that the "normal main groove" only need to have the maximum groove width at the tread surface position, and the minimum groove width may be at the position other than the groove bottom.

Here, "gradually decrease" means that the groove width is constantly decreasing.

In addition, as illustrated in FIGS. 2 and 3B, at least one circumferential main groove other than the at least one shoulder main groove, the center main groove 22 in this embodiment, is a widened main groove configured such that at least one maximum groove width position in the groove depth direction is located on the groove bottom side than the tread surface position. In this example, for the center main groove 22, in the reference condition, the groove width w4 at the groove bottom is a maximum groove width, and on the outer side in the tire radial direction than the groove bottom, i.e., the tread surface 1 side, the groove width is smaller than the groove width w4 at any position. In this embodiment, the groove width gradually decreases from the groove bottom side having the groove width w4 toward the outer side in the tire radial direction, and the groove width w3 at the tread surface 1 is a minimum groove width. Note, that the "widened main groove" only need to have at least one of the maximum groove width positions in the groove depth direction on the groove bottom side than the tread surface position. Therefore, the term "widened main groove" shall include a configuration with multiple maximum groove width positions in the groove depth direction as well as a configuration with a constant groove width in the groove depth direction. However, from the viewpoint of more effectively reducing air column resonance sound, etc., as described below, it is preferable that the "widened main groove" not have a constant groove width in the groove depth direction, and that all maximum groove width positions in the groove depth direction be on the groove bottom side than the tread surface.

Hereinafter, the effects of the tire configuration of the first embodiment will be described with reference to FIG. 4.

Figure 4:
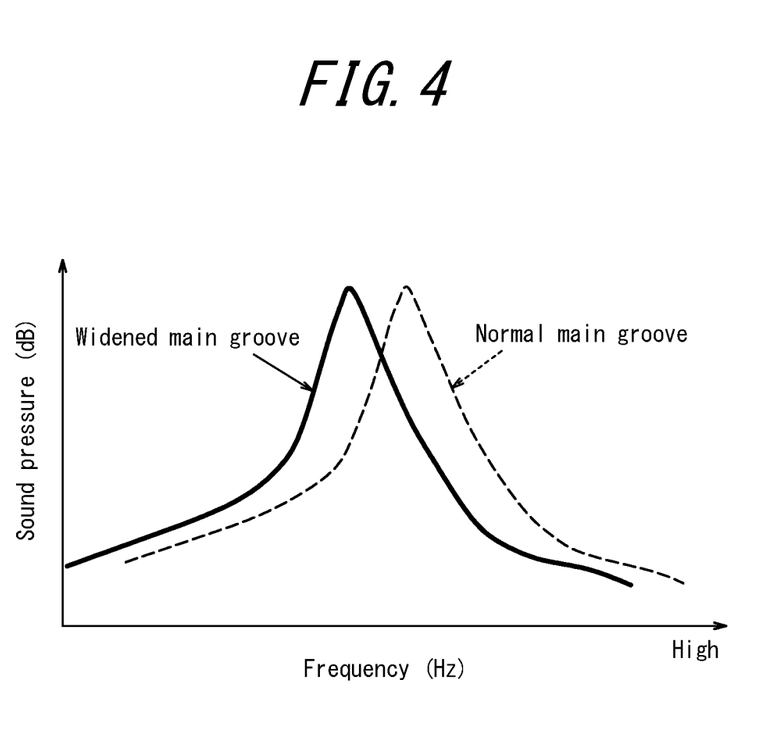
FIG. 4 is a diagram for explaining the frequency of air column resonance sound.

FIG. 4 is a diagram for explaining the frequency of air column resonance sound of the circumferential main grooves. FIG. 4 provides the relationship between sound pressure and frequency of air column resonance sound in the normal main groove and in the widened main groove.

In the normal main groove, the maximum groove width position is located only at the tread surface position, so the groove opening which is in contact with the road surface and air has an open shape. In contrast, in the widened main groove, the maximum groove width position is located on the side of the groove bottom rather than the tread surface position, so the groove opening which is in contact with the road surface and air has a closed shape, compared to the normal main groove. Here, the widened main groove behaves as a relatively "longer" tube than the normal main groove having the same cross-sectional area due to the opening edge correction. Thus, when the tube behaves as a relatively longer length, the frequency of air column resonance sound generated in the circumferential main groove as the vehicle is running is relatively low. Therefore, in the widened main groove, the peak of the sound pressure level can be shifted to the lower frequency side than in the normal main groove.

In this way, by shifting the frequency at the peak of air column resonance sound generated in the circumferential main grooves as the vehicle is running between the normal main groove and the widened main groove, the peak value of the sum of these sound pressures can be lowered, thus reducing air column resonance sound and mitigating (making it less grating) the overall noise of the tire.

In addition, according to the tire of this embodiment, since the center main groove 22 is configured such that the maximum groove width position of the center main groove 22 is located at the groove bottom side rather than the tread surface position, thus the portion having the larger groove width are exposed on the tread surface 1 when tire wear develops, the drainage performance when tire wear develops can be improved compared to the case where the maximum groove width position of the center main groove 22 is located at the tread surface position, and the reduction in drainage performance can be suppressed even when tire wear develops. Since the center main groove 22 is positioned inward in the tire width direction from the shoulder main grooves 21a and 21b, the ground contact pressure in the tire width direction tends to be higher relative to the shoulder main groove side as the tire is running straight, which is particularly effective in ensuring sufficient drainage performance as the tire is running straight and when tire wear develops.

Hereinafter, preferred configurations, modifications, etc. of the tire of the first embodiment will be described.

In the tire 10 of the first embodiment, the number of normal main grooves and widened main grooves is not limited as long as there is one or more of each, however, it is preferably that the circumferential main grooves 2 include a pair of shoulder main grooves 21a and 2b and at least one center main groove 22, and that the pair of shoulder main grooves 21a and 21b is a normal main groove and the center main groove 22 is a widened main groove.

Here, in general, the ground contact length of the tire is longer on the tire equatorial plane CL side than on the tread edge TE side, and consequently, the ground contact length of the circumferential main groove is also generally longer on the tire equatorial plane CL side than on the tread edge TE side. On the other hand, the frequency of sound pressure peak of air column resonance sound is lower in the circumferential main grooves with longer ground contact length than in the circumferential main grooves with shorter ground contact length when compared with the circumferential main grooves having the same cross-sectional shape and size, and consequently, the circumferential main groove on the tire equatorial plane CL side generally has a lower frequency of sound pressure peak of air column resonance sound than the circumferential main groove on the tread edge TE side. Therefore, by making the circumferential main groove on the tread edge TE side a normal main groove and making the circumferential main groove on the tire equatorial plane CL side a widened main groove with the lower frequency of sound pressure peak than the normal main groove as described above, the difference in frequency of the sound pressure peak between the circumferential main groove on the tread edge TE side and the circumferential main groove on the tire equatorial plane CL side can be further increased, and in turn, the peak value of the sum of these sound pressures can be further reduced.

In other words, the above configuration can balance and distribute the frequencies of air column resonance sound as the vehicle is running to reduce air column resonance sound more effectively and mitigate (make it less grating) the overall noise of the tire.

In the tire 10 of the first embodiment, the ratio of the number of widened main grooves to the number of normal main grooves (number of widened main grooves/number of normal main grooves) is 1/2, since the number of center main grooves 22, which are the widened main grooves, is one and the number of shoulder main grooves 21a and 21b, which are the normal main grooves, are two. However, the ratio of the number of widened main grooves to the number of normal main grooves is not particularly limited.

In the tire 10 of the first embodiment, the ratio of the number of widened main grooves to the number of normal main grooves is preferably 1/1 to 3/2. This configuration can balance and distribute the frequencies of air column resonance sound as the vehicle is running to reduce air column resonance sound more effectively and mitigate (make it less grating) the overall noise of the tire.

In the tire 10 of the first embodiment, the center main groove 22, which is the widened main groove, preferably has a portion where the groove width gradually increases from the tread surface 1 side to the groove bottom side. Such a configuration can suppress the reduction in drainage performance when tire wear develops in the long term. More preferably, the groove width increases progressively from the tread surface 1 to the groove bottom. Such a configuration can more effectively suppress the deterioration in drainage performance when tire wear develops in the long term more effectively.

In the tire of the first embodiment, each circumferential main groove 2 needs to have a groove width that prevents the two side walls from contacting each other when the tire is grounded, but the minimum groove width (the groove width w2 and w3 in the examples in FIGS. 3A and 3B) is preferably 1.5 mm or more. This configuration can reliably reduce air column resonance sound as the vehicle is running, and can ensure sufficient drainage performance both when new and when tire wear develops.

The depth of each circumferential main groove 2 (the groove depths d1 and d2 in the examples in FIGS. 3A and 3B) is preferably 3.0 mm or more. This ensures sufficient drainage performance. From the viewpoint of the rigidity of the tire 10, the groove depth of each circumferential main groove 2 (the groove depths d1 and d2 in the examples in FIGS. 3A and 3B) is preferably 20 mm or less. More preferably, the groove depth of each circumferential main groove 2 is 3.0 mm or more in terms of ensuring sufficient drainage performance, and 15 mm or less in terms of the rigidity of the tire 10.

In the tire of the first embodiment 1, the inclination angles θ1 and θ2 of the sidewalls 211 and 222 comprising the shoulder main grooves 21a and 21b, which are normal main grooves, are preferably 91° or more from the viewpoint of securing rigidity. Also, the inclination angles θ1 and θ2 are preferably 150° or less from the viewpoint of ensuring sufficient drainage performance. More preferably, the inclination angles θ1 and θ2 are 100° or more in terms of securing rigidity and 130° or less in terms of securing sufficient drainage performance.

Here, the "inclination angle of sidewalls 211 and 222 comprising the shoulder main grooves 21a and 21b, which are the normal main grooves" means the angle formed by the tread surface 1 and the sidewall 211, and the tread surface 1 and the sidewall 222, respectively, at the respective opening edges of the shoulder main grooves 21a and 2b, in the cross-sectional view in the tire width direction.

In the tire of the first embodiment, the inclination angles θ3 and θ4 of the sidewalls 221 and 222 comprising the center main groove 22, which is the widened main groove, are preferably 30° or more to prevent the opening edge from being bent at the tread surface 1 at the time of grounding. Also, the inclination angles θ3 and θ4 are preferably 89° or less in order to suppress the reduction in drainage performance when tire wear develops in the long term. More preferably, the inclination angles θ3 and θ4 are 50° or more from the viewpoint of effectively preventing the opening edge of the tread surface 1 from being bent at the time of grounding, and 85° or less from the viewpoint of more effectively suppress the deterioration in drainage performance when tire wear develops in the long term.

Here, the "inclination angle of sidewalls 221 and 222 comprising the center main groove 22, which is the widened main groove" means the angle formed by the tread surface 1 and the sidewall 221, and the tread surface 1 and the sidewall 222, respectively, at the opening edge of the center main groove 22.

Figure 5:
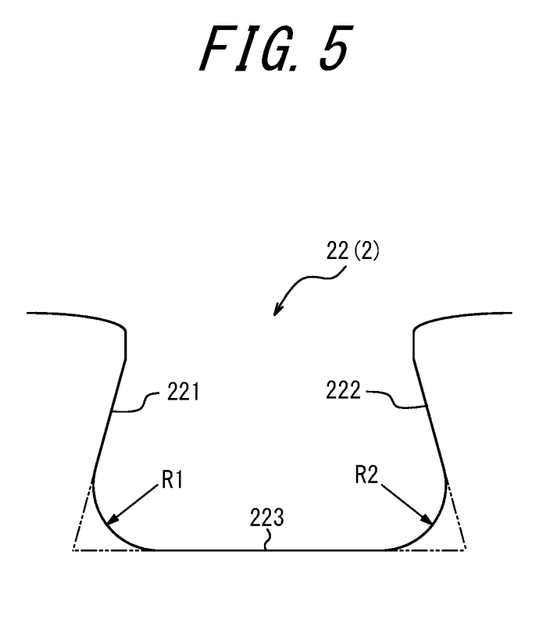
FIG. 5 illustrates another example of a widening main groove.

Furthermore, in the tire 10 of the first embodiment, in the example illustrated in FIG. 3B, the sidewall 221 and the groove bottom 223, and the sidewall 222 and groove bottom 223, which comprise the center main groove 22, which is the widened main groove, are straight in cross section perpendicular to the extending direction of the groove, respectively. However, as illustrated in FIG. 5, the boundary between the sidewall 221 and the groove bottom 223 and the boundary between the sidewall 222 and the groove bottom 223 may be configured with arc-shaped sidewalls and groove bottom having radius of curvature R1 and R2.

This configuration can increase the durability of the center main groove 22, which is the widened main groove.

In the tire 10 of the first embodiment, the values of radius of curvature R1 and R2 are not limited, but the radius of curvature R1 and R2 are preferably 0.5 mm or more. This configuration effectively prevents cracking at the boundary between the sidewall 221 or sidewall 222 and the groove bottom 223, thereby making the center main groove 22 more durable. From the viewpoint of drainage performance, the radius of curvature R1 and R2 are preferably 5.0 mm or less. More preferably, the radius of curvature R1 and R2 are 1 mm or more in terms of greater durability of the center main groove 22 and 3.0 mm or less in terms of drainage performance.

In this embodiment, the center main groove 22 is preferably located entirely in the center region C, and the shoulder main grooves 21a and 21b are preferably located entirely in the shoulder region S, respectively. Here, the center region C shall refer to the area of the tread surface 1 that is centered on the tire equatorial plane CL and whose width in the tire width direction is 50 percent of the ground contact width TW. On the other hand, the shoulder region S shall refer to a pair of regions of the tread surface 1 that are on the outer side in the tire width direction of the tread surface 1 than the center region C.

Such a configuration can more effectively reduce air column resonance sound and ensure sufficient drainage performance.

In addition, in the tire 10 of the first embodiment, the ground contact length of the tire 10 is suitably longer on the tire equatorial plane CL side than on the tread edge TE side. Also, in the tire 10 of the first embodiment, the ground contact length of the circumferential main grooves 2 is suitably longer in the center main groove 22 than in the shoulder main grooves 21a and 21b.

As mentioned above, this configuration can reliably shift the frequency at the peak of air column resonance sound generated in the circumferential main groove as the vehicle is running between the normal main groove and the widened main groove, thereby reducing air column resonance sound and mitigating (making it less grating) the overall noise of the tire.

Second Embodiment

Next, a tire according to another embodiment (Second embodiment) of the present disclosure will be described with reference to FIG. 6. The tire 11 of the second embodiment has the same configuration as the tire 10 of the first embodiment, except that it comprises a width direction groove that is connected to the normal main groove, and components similar to those in the first embodiment are given the same reference numerals and their explanations will be omitted.

Figure 6:
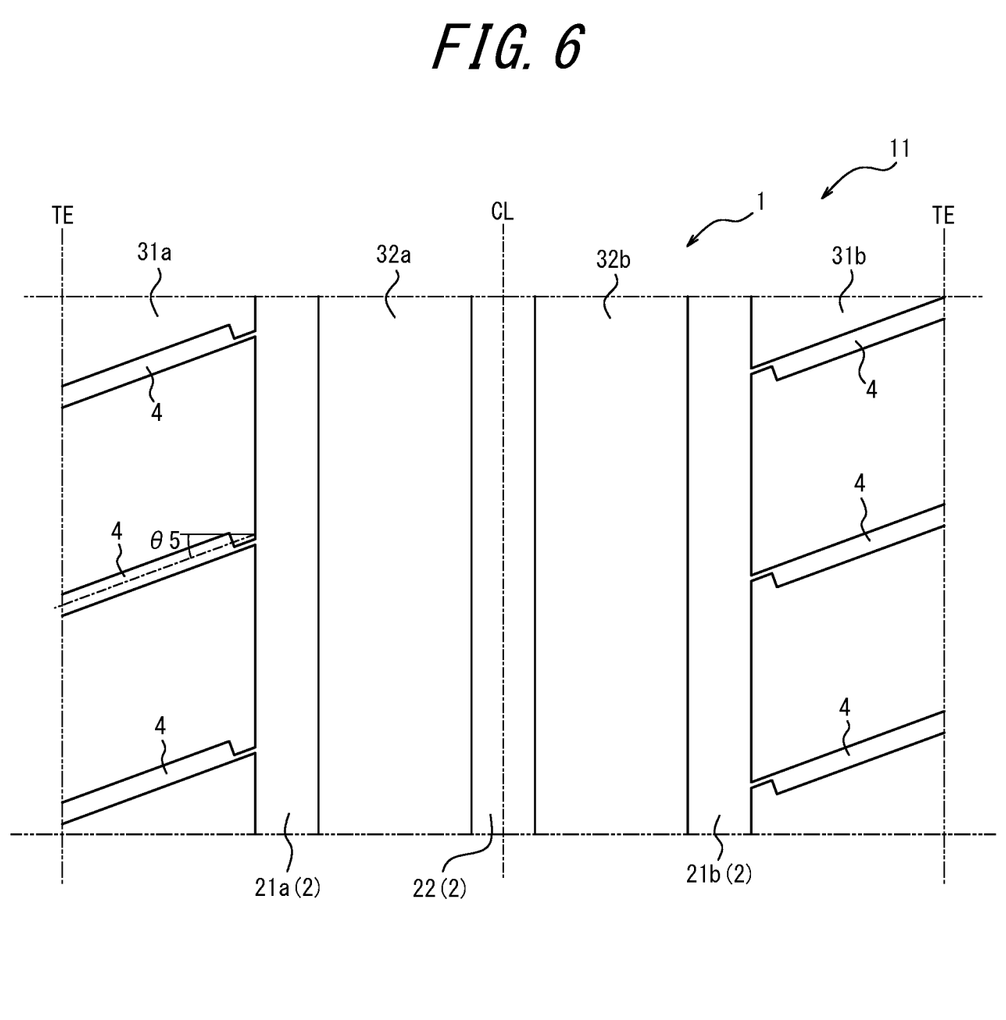
FIG. 6 is a partially developed view of a tire according to the second embodiment of this disclosure, schematically illustrating the tread surface.

FIG. 6 is a partially developed view of a tire 11 according to the second embodiment of this disclosure, schematically illustrating the tread surface.

The tire 11 of the second embodiment comprises width direction grooves 4 that are connected to the shoulder main grooves 21a and 21b, which are the normal main grooves, extends in the tire width direction (in this embodiment, at a predetermined angle exceeding 0° with respect to the tire width direction), and opens at the tread edge TE.

In the tire 11 of the second embodiment, the width direction grooves 4 are disposed on the shoulder land portions 31a and 31b, are connected to the shoulder main grooves 21a or 21b, respectively, extend in the tire width direction, and open at the tread edge TE.

The width direction grooves 4 can be either line symmetrically or point symmetrically arranged with respect to the tire equatorial plane CL, and need not be either line symmetrically or point symmetrically arranged with respect to the tire equatorial plane CL. In the example in FIG. 6, the width direction grooves 4 disposed on the shoulder land portion 31a and the width direction grooves 4 disposed on the shoulder land portion 31b are arranged so as to be displaced in the tire circumferential direction from a point-symmetrical state with respect to the tire equatorial plane CL.

Hereinafter, the effects of the configuration of the tire 11 of the second embodiment will be described with reference to FIG. 7.

Figure 7:
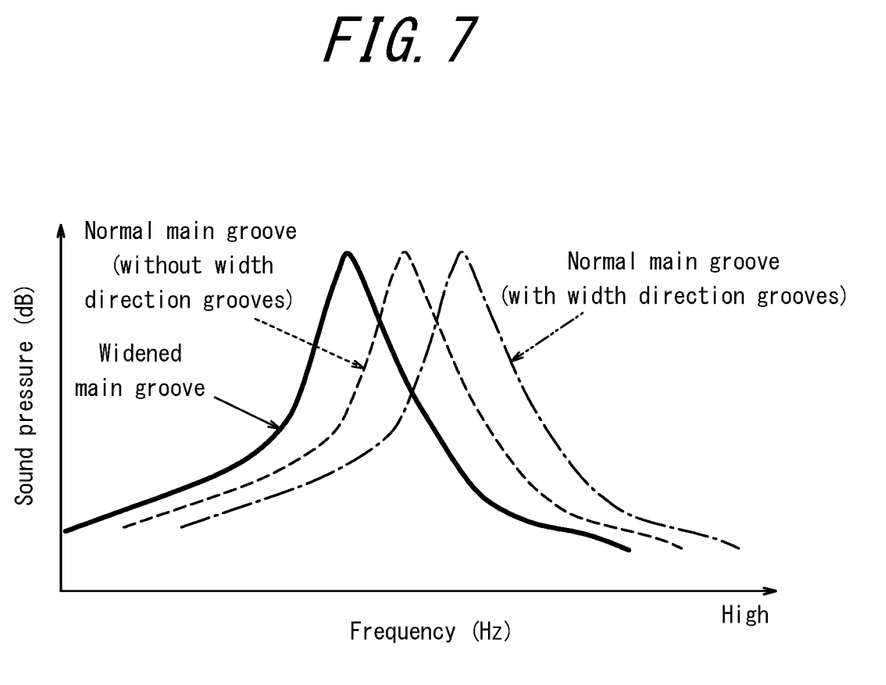
FIG. 7 is a diagram for explaining the frequency of air column resonance sound.

FIG. 7 is a diagram for explaining the frequency of air column resonance sound in the circumferential main groove. FIG. 7 provides the relationship between sound pressure and frequency of air column resonance sound in a normal main groove (with width direction groove), a normal main groove (without width direction groove), and a widened main groove.

Here, the "normal main groove (with width direction groove)" refers to a normal main groove provided with a width direction groove that is connected to the normal main groove, extends in the width direction of the tire, and opens at the tread edge TE, and the "normal main groove (without width direction groove)" refers to a normal main groove not provided with a width direction groove.

By providing a width direction groove to the normal main groove that connects the normal main groove to the tread edge TE, the air column resonance sound in the normal main groove will have a relatively higher frequency than that of the normal main groove not provided with the width direction groove. Therefore, the normal main groove with a width direction groove can shift the peak of the sound pressure level to a higher frequency side than the normal main groove without a width direction groove.

In addition, as with the widened main grooves of the tire 10 of the first embodiment, in the tire 11 of the second embodiment, the peak of the sound pressure level can be shifted to the lower frequency side in the widened main grooves than in the normal main grooves without a width direction groove.

In this way, the frequencies at the peak of air column resonance sound generated in the circumferential main grooves as the vehicle is running can be shifted more significantly between the normal main groove with width direction grooves and the widened main groove, and the peak value of the sum of these sound pressures can be lower, thereby reducing air column resonance sound more efficiently. This allows for more efficient reduction of air column resonance sound.

Figure 8:
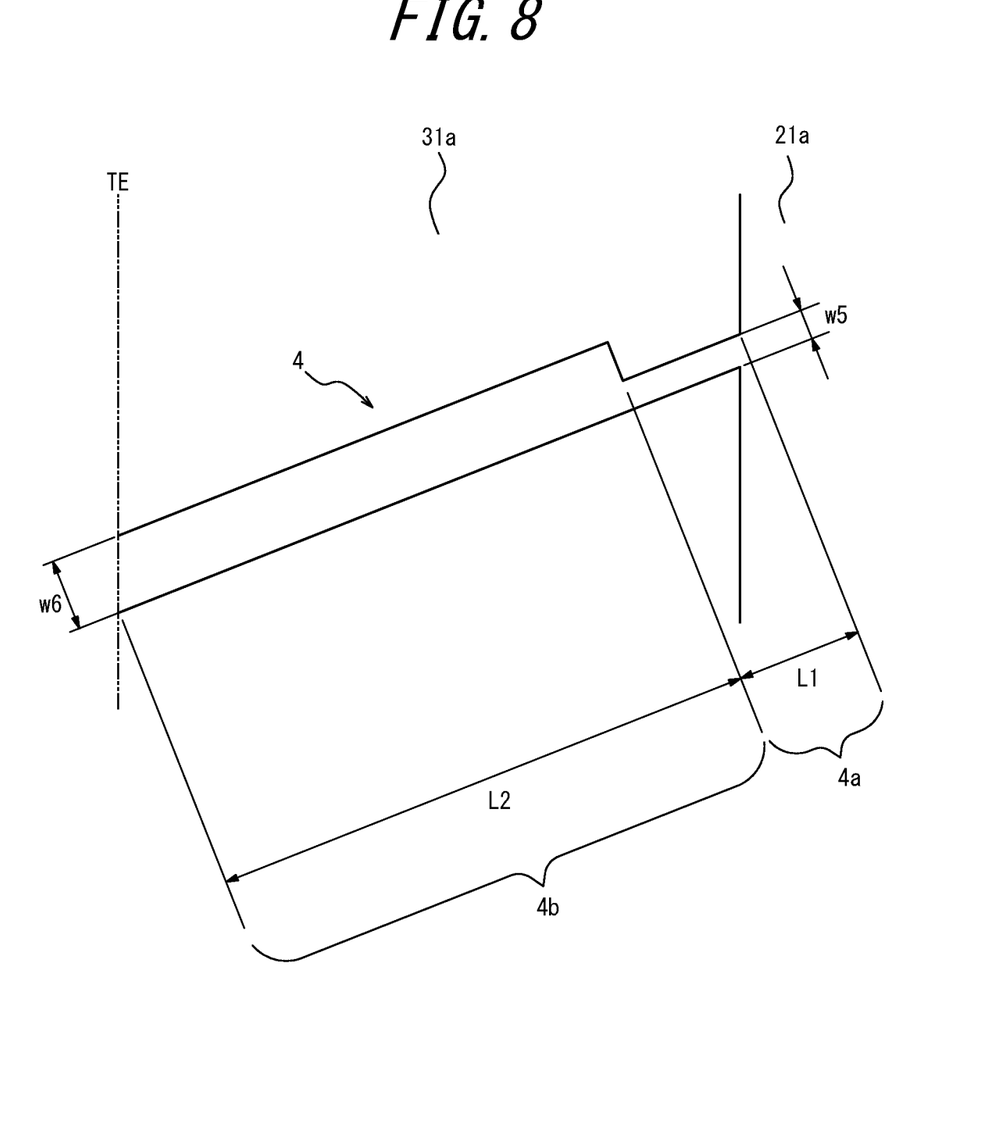
FIG. 8 is a partially developed view, schematically illustrating an enlarged portion of the tread surface in FIG. 6.

Hereinafter, with reference to FIGS. 6 and 8, preferred configurations and modified examples of the width direction groove 4 will be described. FIG. 8 is a partially developed view, schematically illustrating an enlarged portion of the tread surface in FIG. 6. For illustration purposes, however, FIG. 8 is drawn at a slightly different scale than FIG. 6.

Although the width direction grooves 4 are disposed in the shoulder land portions 31a and 31b, respectively, theses have the same configuration, as mentioned above, except that they are arranged so as to be displaced in the tire circumferential direction from a point-symmetrical state with respect to the tire equatorial plane CL in the example in FIG. 6. Therefore, the width direction grooves 4 disposed in the shoulder land portion 31a will be described below as a typical example.

The width direction groove 4 may have a shape with constant groove width on the tread surface 1, or a shape in which the groove width changes in the middle of the tire width direction. The width direction groove 4 preferably has a larger groove width at the tread surface 1 on the side opening to the tread edge TE than on the side connecting to the shoulder main groove 21a, which is the normal main groove. As illustrated in FIG. 8, the width direction groove 4 comprises a first portion of width direction groove 4a that is connected to the shoulder main groove 21a, and a second portion of width direction groove portion 4b that is adjacent to and connected to the first portion of width direction groove 4a at the tread edge TE side and opens at the tread edge TE. The groove width w6 at the tread surface 1 of the second portion of width direction groove 4b is larger than the groove width w5 at the tread surface 1 of the first portion of width direction groove 4a.

According to this configuration, air flow from the narrower first portion of width direction groove 4a, which is connected to the shoulder main groove 21a, to the wider second portion of width direction groove 4b is formed, and this promotes air flow outward in the tire width direction and further reduces air column resonance sound. In addition, moisture can easily flow from the narrower first portion of width direction groove 4a to the wider second portion of width direction groove 4b, and this facilitates drainage to the tread edge TE side and ensures sufficient drainage performance of the tire.

In the width direction groove 4, the groove width w5 of the first portion of width direction groove 4a, which is connected to the shoulder main groove 21a, is preferably at least 1 mm narrower than the groove width w6 of the second portion of width direction groove 4b. This configuration allows for more effective reduction of air column resonance sound.

In the tire 11 of the second embodiment, the groove width w5 at the tread surface 1 of the first portion of width direction groove 4a is preferably 0.3 mm or more. This configuration allows sufficient air to flow from the shoulder main groove 21a into the first portion of width direction groove 4a, thereby providing a better function of reducing air column resonance sound. More suitably, it is 0.4 mm or more.

In the width direction groove 4, the groove width w6 at the tread surface 1 of the second portion of width direction groove 4b opening at the tread edge TE only needs to have a groove width that prevents the two side walls from contacting each other when the tire is grounded, but it is more preferred to have a groove width of 1.5 mm or more. This configuration can effectively reduce air column resonance sound and ensure sufficient drainage performance.

The groove depth of the first portion of width direction groove 4a of the width direction groove 4 is preferably about the same as that of the second portion of width direction groove 4b. This is because, according to this configuration, drainage performance can be maintained and air column resonance sound can be reduced even in tires after wear.

In addition, in the width direction groove 4, the groove depth of the second portion of width direction groove 4b is preferably as deep as the shoulder main groove 21a. More specifically, the groove depth of the second portion of width direction groove 4b is suitably 3.0 mm or more. This ensures sufficient drainage performance. From the viewpoint of the rigidity of the tire 11, the groove depth of the second portion of width direction groove 4b is suitably 20 mm or less. More preferably, the groove depth of the second portion of width direction groove 4b is 5.0 mm or more in terms of ensuring sufficient drainage performance, and 15 mm or less in terms of rigidity of the tire 10.

Figure 9:
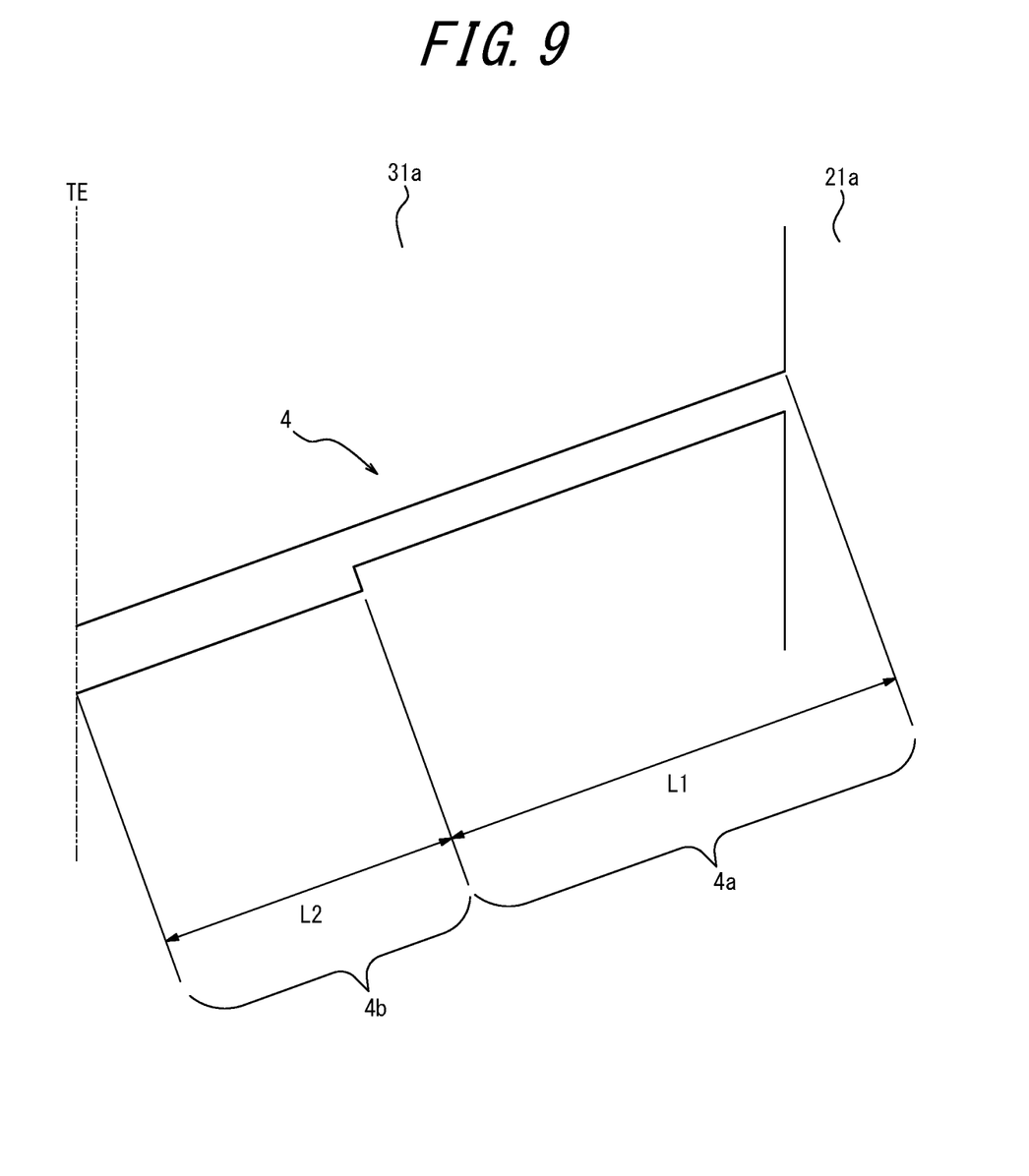
FIG. 9 explains another example of a width direction groove.

The width direction groove 4 has a length L1, along its extending direction, of the first portion of width direction groove 4a shorter than the length L2, along its extending direction, of the second portion of width direction groove 4b in the examples in FIGS. 6 and 8. However, not limited to this configuration, the length L1, along its extending direction, of the first portion of width direction groove 4a may be longer than the length L2, along its extending direction, of the second portion of width direction groove 4b, as illustrated in FIG. 9. However, the length L1 being shorter than the length L2 is preferable in terms of providing a volume difference between the first portion of width direction groove 4a and the second portion of width direction groove 4b so that to reducing air column resonance sound.

The width direction groove 4 preferably has an inclination angle θ5 of 0° to 20° relative to the tire width direction at the tread surface 1. By setting the inclination angle between 0° and 20°, air column resonance sound can be reduced, while preventing uneven wear at the opening end of the width direction groove 4 to the shoulder main groove 21a, as well as the generation of other noises. The inclination angle θ5 is more preferably between 5° and 150 from the viewpoint of preventing uneven wear and other noise generation.

In the second embodiment, the width direction grooves 4 are preferably disposed at both ends of the ground contact patch so that the number of grooves in the ground contact patch of the tire 11 is 4 to 10 at both ends of the ground contact patch. Here, in the "number of grooves in the ground contact patch", if any part of the width direction groove 4 is located in the ground contact patch, it is considered to be located in the ground contact patch.

This configuration can more effectively reduce air column resonance sound and ensure sufficient drainage performance.

More specifically, the width direction grooves 4 are preferably disposed at intervals of 10 to 40 mm in the tire circumferential direction on one side of the tread edge TE bounded by the tire equatorial plane CL. This configuration can more effectively reduce air column resonance sound and ensure sufficient drainage performance. More preferably, they are disposed at intervals of 20 to 30 mm in the tire circumferential direction.

INDUSTRIAL APPLICABILITY

The tires according to the present disclosure can be used for any type of pneumatic tire, but are suitably used for passenger vehicle pneumatic tires.

REFERENCE SIGNS LIST

1 Tread surface
2 Circumferential main groove
4 Width direction groove
4a First portion of width direction groove
4b Second portion of width direction groove
10, 11 Tire
21a, 21b Shoulder main groove
22 Center main groove
31a, 31b Shoulder land portion
32a, 32b Center land portion
60 Belt
70 Carcass
80 Tread rubber
90 Tread portion
211, 212, 221, 222 Sidewall
213, 223 Groove bottom
S Shoulder region
C Center region
CL Tire equatorial plane
TE Tread edge

The invention claimed is:

1. A tire comprising a plurality of circumferential main grooves, on a tread surface, extending in the tire circumferential direction and having a groove width that prevents two side walls from contacting each other when the tire is grounded, wherein
   when a pair of circumferential main grooves, located closest to tread edges on each side in the tire width direction among the plurality of circumferential main grooves, are referred to as shoulder main grooves, and circumferential main grooves other than the shoulder main grooves are referred to as center main grooves,
   all of the shoulder main grooves are normal main grooves configured such that a maximum groove width position in the groove depth direction is located only at a tread surface position,
   all of the center main grooves are widened main grooves configured such that at least one maximum groove width position in the groove depth direction is located on a groove bottom side than the tread surface position,
   the ratio of the number of widened main grooves to the number of normal main grooves is 1/1 to 3/2,
   the tire further comprises a width direction groove that is connected to the shoulder main groove, which is the normal main groove; extends in the tire width direction; and opens at the tread edge,
   the width direction groove has a greater groove width on the tread edge side than on the side connecting to the shoulder main groove, which is the normal main groove, and
   a cross-sectional shape of each of the widened main grooves is an unobstructed trapezoid defined by a pair of continuous sidewalls and a continuous groove bottom.

2. The tire according to claim 1, wherein the widened main groove has a portion where the groove width gradually increases from the tread surface side to the groove bottom side.

3. The tire according to claim 2, wherein each circumferential main groove has a minimum groove width of 1.5 mm or more.

4. The tire according to claim 1, wherein each circumferential main groove has a minimum groove width of 1.5 mm or more.

* * * * *